(12) United States Patent
Chen et al.

(10) Patent No.: US 10,242,540 B2
(45) Date of Patent: Mar. 26, 2019

(54) VISUALIZATION FOR PAYMENT CARD TRANSACTION FRAUD ANALYSIS

(75) Inventors: Yonghui Chen, San Diego, CA (US); Gregory Gancarz, San Diego, CA (US); Scott M. Zoldi, San Diego, CA (US)

(73) Assignee: FAIR ISAAC CORPORATION, Roseville, MN (US)

( * ) Notice: Subject to any disclaimer, the term of this patent is extended or adjusted under 35 U.S.C. 154(b) by 1259 days.

(21) Appl. No.: 12/553,047

(22) Filed: Sep. 2, 2009

(65) Prior Publication Data

US 2011/0055074 A1 Mar. 3, 2011

(51) Int. Cl.
G06Q 40/00 (2012.01)
G07F 19/00 (2006.01)
G06Q 20/10 (2012.01)
G06Q 20/40 (2012.01)

(52) U.S. Cl.
CPC ........... *G07F 19/201* (2013.01); *G06Q 20/10* (2013.01); *G06Q 20/40* (2013.01); *G06Q 20/405* (2013.01); *G06Q 20/4016* (2013.01)

(58) Field of Classification Search
CPC .......................... G06Q 20/4016; G07F 19/201
USPC ............ 705/35–40, 26, 36 R, 1, 43, 44, 318
See application file for complete search history.

(56) References Cited

U.S. PATENT DOCUMENTS

| | | | |
|---|---|---|---|
| 7,072,863 B1* | 7/2006 | Phillips et al. | 705/36 R |
| 7,089,592 B2* | 8/2006 | Adjaoute | G06Q 20/04 726/1 |
| 7,249,094 B2* | 7/2007 | Levchin | G06Q 20/10 705/35 |
| 7,263,506 B2* | 8/2007 | Lee et al. | 705/38 |
| 7,940,899 B2* | 5/2011 | Moorman et al. | 379/88.19 |
| 8,065,227 B1* | 11/2011 | Beckman | G06Q 40/02 705/39 |
| 8,086,519 B2* | 12/2011 | Mylet et al. | 705/37 |
| 8,639,522 B2* | 1/2014 | Pathria | G06Q 10/10 705/2 |
| 2005/0038737 A1* | 2/2005 | Norris | 705/39 |
| 2005/0222928 A1* | 10/2005 | Steier et al. | 705/35 |
| 2005/0222931 A1* | 10/2005 | Mamou et al. | 705/35 |
| 2007/0112667 A1* | 5/2007 | Rucker | 705/38 |
| 2007/0244782 A1* | 10/2007 | Chimento | 705/35 |
| 2008/0046362 A1* | 2/2008 | Easterly | 705/40 |
| 2008/0091453 A1* | 4/2008 | Meehan et al. | 705/1 |
| 2008/0275814 A1* | 11/2008 | Milana | 705/39 |

\* cited by examiner

*Primary Examiner* — Edward Chang
(74) *Attorney, Agent, or Firm* — Mintz Levin Cohn Ferris Glovsky and Popeo, P.C.

(57) ABSTRACT

A computer-implemented method and system for visualizing card transaction fraud analysis is presented. Transaction data and account data related to one or more payment card accounts is stored in a database. The transaction data includes a fraud score. A computer processor generates one or more of a plurality of visualizations of activity of at least one suspicious account from the one or more payment card accounts for display in a graphical user interface, each of the plurality of visualizations providing at least a graphical representation of the transaction data and which is selectable from a menu provided by the computer processor in the graphical user interface. The visualizations assist in case judgment of the one or more payment cards.

14 Claims, 7 Drawing Sheets

VISUALIZATION FOR PAYMENT CARD TRANSACTION FRAUD ANALYSIS

BACKGROUND

This disclosure relates generally to fraud detection, and more particularly to a system and method for abstracting transactions for visualization of fraud detection.

Conventional fraud detection systems usually give a score on a transaction of a Payment Card or Payment Instrument, such as an authorization for a credit or debit card. The score, representing a fraud risk level, is typically generated by an artificial intelligence system, such as a neural network trained on historical data. In most scenarios, a fraud case is created when the transaction score is above a fraud risk threshold. This score is usually used as the main criteria for creating cases, though expert rules can also create cases independent of the score. Some fraud detection systems provide reason codes for high score cases.

During case processing, an analyst attempts to contact the legitimate cardholder, often by phone, to review the transactions in question, to determine whether the account is in a fraudulent state. Sometimes the cardholder cannot be reached. Other times, the analyst may choose to not contact card holders for some types of cases to save time. In both of these situations, analysts may review the case and decide whether an account appears to be fraud based on their own intuition, or using their expert knowledge. Visualization techniques provide domain-specific interfaces that can help analysts make better decisions more quickly and easily.

Visualization is any technique for creating images, diagrams, or animations to present information in an intuitive way to users. Visualization translates data into a visible form that highlights important features of the data. It helps users to perceive important aspects of their data quickly by using innovative techniques and visual representations. Visualization provides different views to look at transaction data, and presents the data in intuitive, understandable, and actionable ways. Moreover, visualization can provide a highly interactive interface between human and automatic systems.

What is needed is visualization for a fraud detection system to provide abstraction for a transaction, a transaction history, transaction profiles, cardholder master-file, and fraud information.

SUMMARY

In general, this document discusses a system and method for visualization for fraud detection. Visualization is any technique for creating images, diagrams, or animations to present information in an intuitive way to users. Visualization presents the transaction data in an intuitive way for payment instrument device issuers, such as payment card issuers, and augments human knowledge and experience to improve the accuracy of case dispositions.

In accordance with one aspect, a system for visualizing payment card transactions for fraud analysis is presented. The system includes a database storing transaction data and account data related to each of one or more payment card accounts. The transaction data includes a fraud score. The system further includes a computer processor that generates one or more of a plurality of visualizations of activity of at least one suspicious account from the one or more payment card accounts for display in a graphical user interface. Each of the plurality of visualizations provides at least a graphical representation of the transaction data and being selectable from a menu provided by the computer processor in the graphical user interface.

In accordance with another aspect, a computer-method for visualizing card transaction fraud analysis is presented. The method includes storing transaction data and account data related to one or more payment card accounts in a database. The transaction data includes a fraud score. The method further includes generating, using a computer processor, one or more of a plurality of visualizations of activity of at least one suspicious account from the one or more payment card accounts for display in a graphical user interface.

In yet another aspect, a computer-implemented method for visualizing and judging payment card transactions for fraud analysis is described. The method includes assisting case judgment via a computer of at least one suspicious account, from one or more payment card accounts, by using the fraud score associated with transaction data and account data of the one or more payment card accounts. The method further includes generating, using the computer, one or more of a plurality of visualizations of activity of the at least one suspicious account for display in a graphical user interface of the computer, each of the plurality of visualizations providing at least a graphical representation of the transaction data and which is selectable from a menu provided by the computer processor in the graphical user interface. The method further includes providing the graphical user interface in a display with user-selectable controls to switch from one of the plurality of visualizations to another of the plurality of visualizations.

The system provides many advantages in detecting frauds when the score is not available or the cardholder cannot be contacted and a client still needs to make a fraud decision concerning the payment device's transaction history. By using a variety of visualization techniques, a client can make a better, more accurate decision. Fraud patterns change over time. An analyst may need to visualize the recent fraud pattern changes, or create some rules or variables to adjust their strategies to catch the recent fraud pattern change. An automatic visualization system provides a useful platform under either circumstance. The system provides an intuitive graphical user interface (GUI) which is highly interactive. The system is designed as a plug-in for any existing fraud detection system and is easily scalable according to a client's needs.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

This document describes a visualization system and method for fraud detection. In fraud detection, visualization may be applied to provide abstraction for the transaction itself, the transaction history, transaction profiles, cardholder master-file, and fraud information.

FALCON™ is an example fraud detection product that helps card issuers detect fraudulent payment cards. The FALCON™ model gives a transaction score representing a fraud risk level on a transaction. A fraud case is created when the transaction score is above a threshold. In fraud detection systems, such as FALCON™, visualization may be applied to provide abstraction for the transaction itself, the transaction history, profiles, cardholder master-file, and fraud information. Visualization provides basic patterns of high score accounts which may explain the reasons for a high score and assist in assigning a fraud judgment on the account transaction history.

Figure 1:
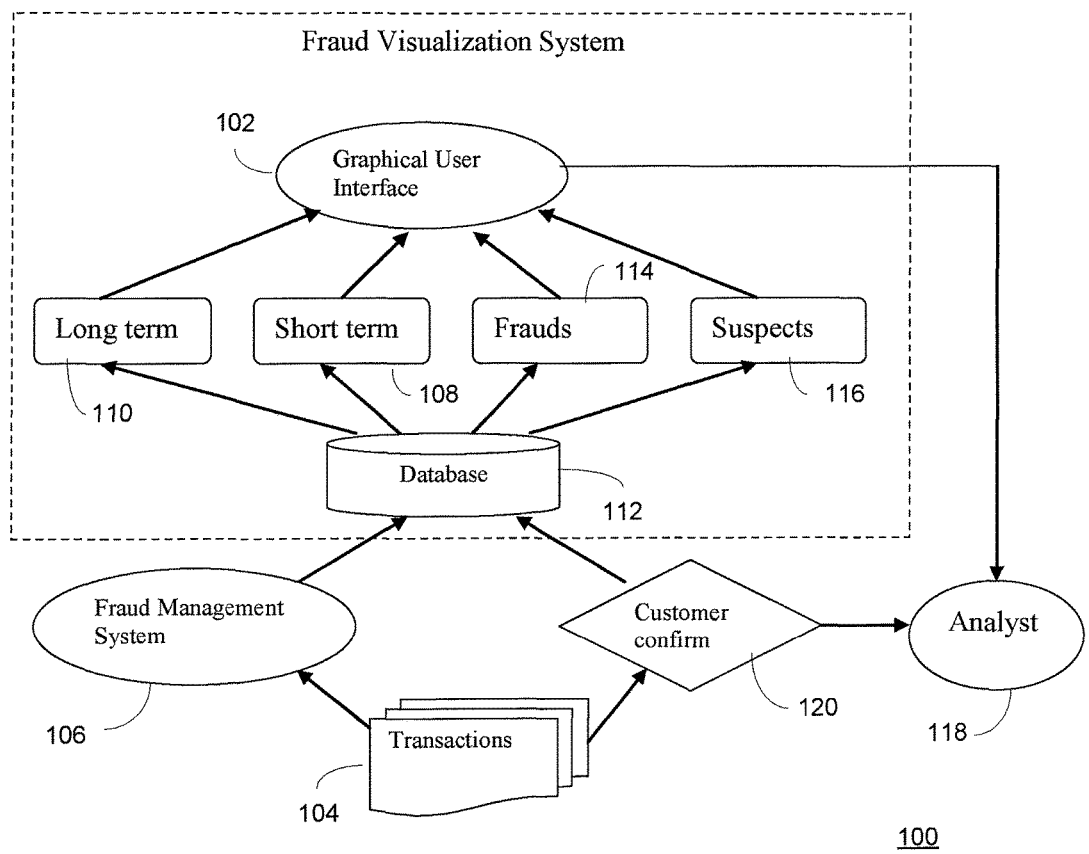
FIG. 1 is a block diagram of a fraud visualization system.

A visualization system is preferably implemented as a computer-executed program. FIG. 1 illustrates a fraud visualization system (FVS) 100. In some systems, the FVS 100 may be implemented as an application that is adapted to be built on top of an existing fraud detecting system as an add-on or plug-in. The FVS 100 generates a visualization of fraud cases for display within a graphical user interface (GUI) 102. When a transaction from one or more transactions 104 enters a fraud management system 106, a "case" is generated if the score is above a threshold. In addition to high-score cases, some users may have their own expert rules according to which cases are created. When the case is generated, a short-term history 108 (usually 5-10 recent transactions) and a long-term history 110 (i.e. two months of transactions) associated with the account are stored in a database 112 for future visualization. Profile variables from the case are stored in the database as well. Some of these profile variables are associated with the state of the account at the time the transaction was scored. All confirmed frauds 114, including frauds detected by automatic detection systems as well as those reported by card holders, are also stored in the database.

When a case is generated, the FVS 100 accesses the database 112 to retrieve the case's transaction history and profile variables 108, 110, and then present them as visualizations on the GUI 102. Confirmed fraud cases 114 and their histories are visualized as a reference. Suspicious accounts 116 (not necessarily frauds) and associated profiles are also visualized as a reference. An analyst 118 may contact the cardholder according to the visualization results to confirm 120 the transaction activity. The following sections describe each part of the FVS 100 in detail.

Data

The FVS for payment cards uses transaction data, card data, fraud tag data, and other account data, such as payment data, to generate visualizations. Both short term historical data and the long term historical data from all high score accounts and confirmed fraud accounts are used. All confirmed fraud transaction data are used in the system as well.

Transaction data fields to be visualized include values for categorical variables, binary variables, and continuous variables. Data fields include but are not limited to: transaction amount, time, fraud score, merchant category code, transaction type, card/merchant geographic location, keyed/swiped, card present or not, and profile variables.

Input data to the system is the original raw data from the data fields. In some applications, the input data also contains transformations from the original data, either based on derived variables from the stored transaction history or from modeling variables used in the creation of the fraud score. The input data can also contain lower dimension data that is transformed from the original data.

Database

Data in the FVS is managed by a relational database. Both the original input transaction data and some profile variables are stored. Some variables may be calculated in real time or near-real time to save storage space. Database tables include a "high score account's transactions" table which contains two month transaction history of high score accounts and some profile variables, and a "high score account's card" table which contains card information of the accounts such as card country, card issue date, etc. The database tables can also include a "confirmed fraud transaction" table which contains confirmed fraud accounts' last two month transaction history with fraud tag and profile variables, and a "confirmed fraud account's card" table contains fraud accounts' card information.

Where a legacy scoring system already has a database, the visualization system can be adapted to utilize the existing fraud system database. For example, the account's card table can utilize an existing fraud system. Some other visualization database tables will need to be created such as, for example, a high score account's transaction table and confirmed fraud transaction table. Variables in the database contain information of accounts and their fraud scores. The database itself is designed to be efficient and compact to save processing time.

Long Term Visualization

An account's long term transaction history indicates a card holder's spending patterns. The long term history is visualized with a time series plot as exemplified in FIG. 2. Two types of time series are depicted. The X axis represents the time of a transaction. At the top half of the figure, the Y axis represents the transaction amount. At the bottom half, the Y axis represents the fraud score.

Figure 2:
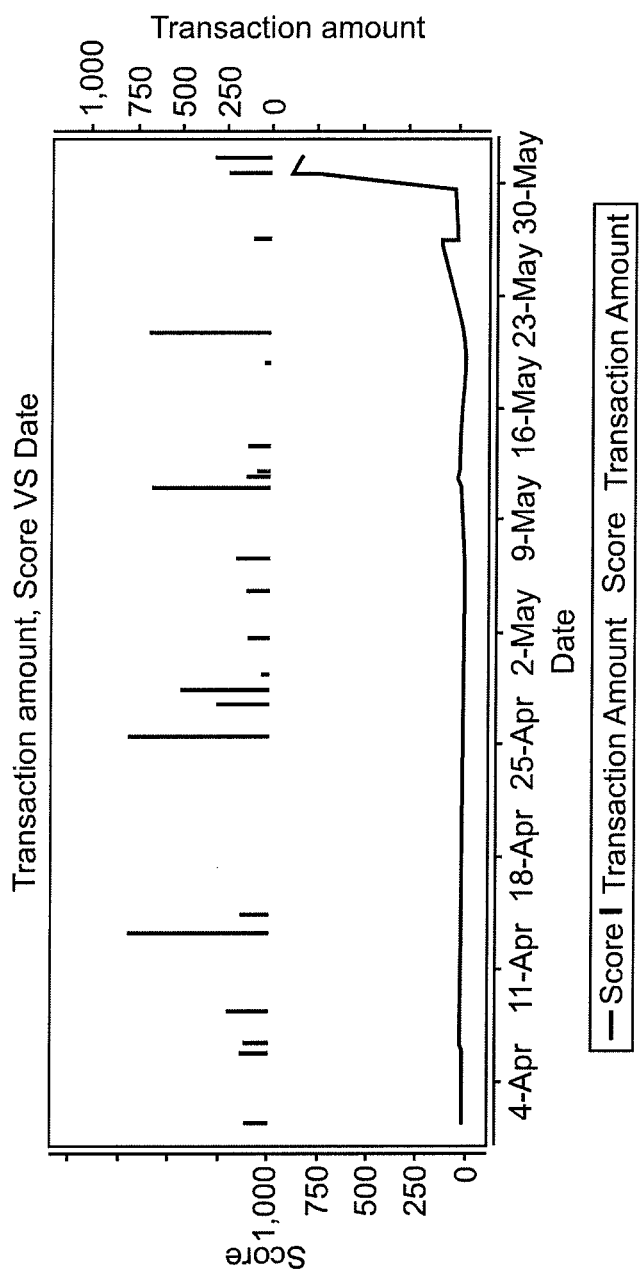
FIG. 2 is a chart illustrating an example visualization for a fraud detection system.

In an example shown in FIG. 2, the time pattern changes of the transaction amount and fraud score can be seen. The account shown has a typical spending pattern and the score is very slow-changing for a long time. On the day of the high score, the transaction amount is not high but transactions happen very often. Accordingly, the high score may be due to rapid transactions. According to preferred methodologies of analyzing these transactions, if these rapid transactions are from an ATM machine, a fraudster is likely using the card. If these transactions happen in a grocery store, it may be from a valid card holder. The analysts can give possible reasons for high score according to their domain knowledge.

The system provides the option of using a single histogram to represent both transaction amount and risk score with color. The fraud score can be coded into color, with high score in red, middle score in yellow and low score in green. Other colors or graphical representations may be used.

Figure 3:
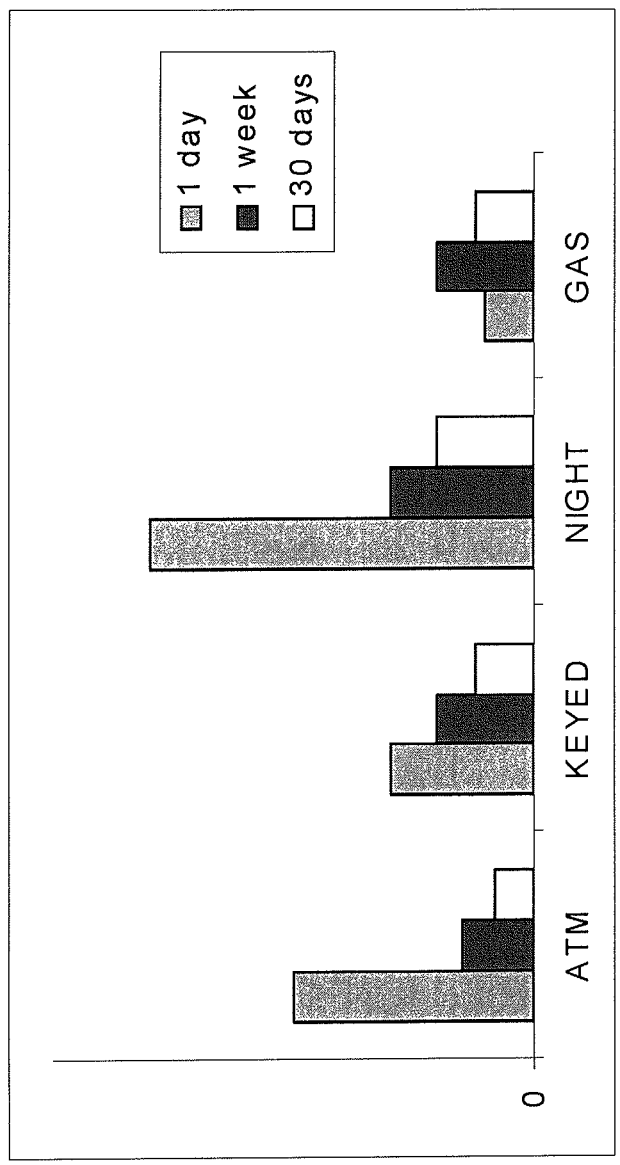
FIG. 3 is a chart illustrating another example visualization for a fraud detection system.

The system can also use bar charts for an account's transaction history in different time frames. FIG. 3 shows an example of such visualization. In this example percentages dollar amount in one day, one week and one month are grouped according to four different categories. The first group shows the percentage of ATM transactions. The second group shows the percentage of transaction entry mode, which in this example is mainly keyed or swiped. The third group represents the percentage of night-time transaction and the fourth group shows percentage of gas transactions in different time frames. The system also provides transaction amount percentage on different categories in different time frames.

The chart shows that in one day, the account has large dollar velocities of ATM transactions and most transactions happen during night time. The dollar average of keyed transactions and gas transactions are relatively stable. Since the account's transaction averages in one day are quite different than those averages over the recent one week or one month, it is likely a fraudster is trying to cash out money from an ATM machine during night time with a stolen card.

Short Term Visualization

Recent transactions indicate the current spending pattern. Several of the most recent transactions are visualized to present the current behavior of an account. Similar to long term visualization, short term history is visualized in time series or bar charts. In addition, an account's short term transactional pattern may be well represented by smoothed curves (FIG. 4) and/or transitional symbols (FIG. 5) on a geographic map.

Figure 4:
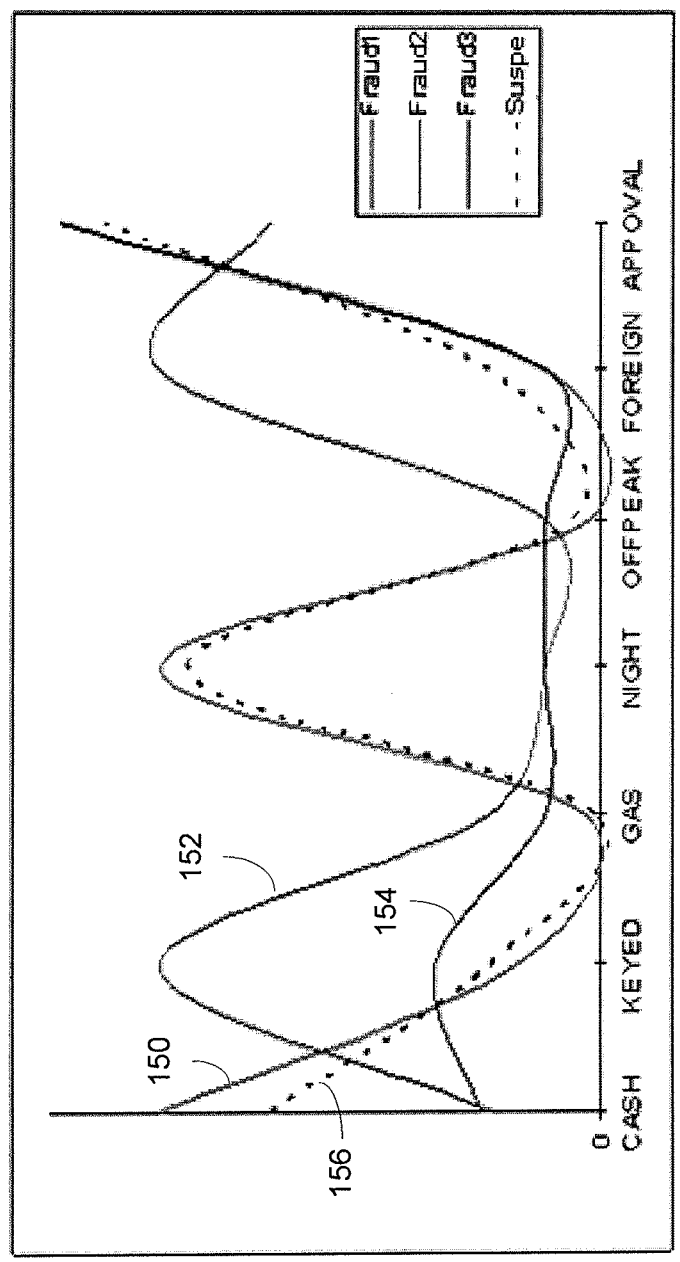
FIG. 4 is a graph illustrating another example visualization for a fraud detection system.

FIG. 4 depicts a chart of smoothed curves which presents an account's short term history compared with different fraud cluster's statistics. Each smoothed curve represents a fraud cluster or suspect's one week history with percentage of transactions on each category. Four curves are integrated in a graph as shown in FIG. 4: the first curve 150 represents fraud cluster 1; the second curve 152 represents fraud cluster 2; the third curve 154 represents fraud cluster 3; the fourth curve 154 represents the suspect's short term transaction statistics. In this example, a transaction percentage of keyed, gas, cash, and night, foreign, etc. were used. Users may choose transaction amount percentage or different categories to be pictured in the graph. The curves in the graph may be depicted using different colors, shadings or dotted arrangements.

The chart gives a summary of an account's spending pattern, and compares it with different fraud clusters. FIG. 4 shows that the suspect is very similar to cluster Fraud1 with low foreign spending but high ATM. With this added information, the analyst can make a more accurate decision whether the account is a fraud according to domain knowledge.

Figure 5:
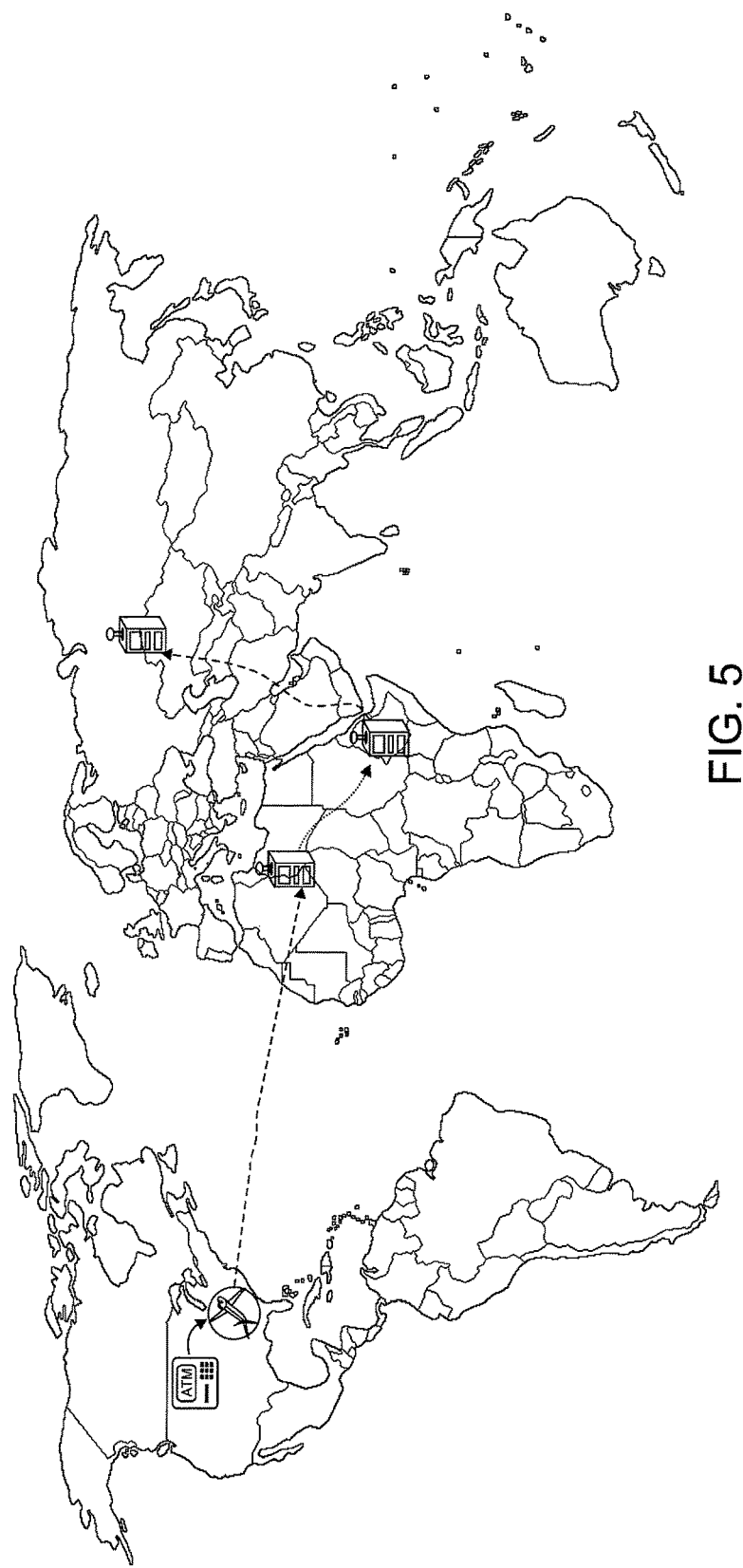
FIG. 5 is a graphic illustration of a visualization of a fraudulent transaction.

An example visualization of transitional symbols on a geographic map is shown in FIG. 5, which demonstrates how much the amount is, where the transaction happens, what the risk level is, and the transaction state movement. In FIG. 5 every transaction is represented by an icon in different color and size, where red represents a high score and green represents a low score, for example. The size of icon represents the transaction amount. Every transaction is located on a geographic map according to the merchant location. A transition between transactions is represented by a line in different color. The system uses icons of the merchant category to represent the transaction. Several major merchant categories, such as gas, ATM, travel and entertainment, are represented by icons which are easy to recognize. Cross border transitions are represented by a dashed line, and domestic transitions are represented by a solid line. As shown in FIG. 5, the account is transacting all over the world in a short period of time. If this is not a business card, most likely it is a fraud and should be blocked even if the card holder cannot be contacted.

Recent Fraud Visualization

Fraud transactions from recent fraud accounts are a good reference to make a decision on a new case. Fraud transactions can be visualized in bar charts and smoothed curve charts. Moreover, fraud transactions can be visualized in clusters in real time so that users have a quick overview of recent fraud patterns.

Figure 6:
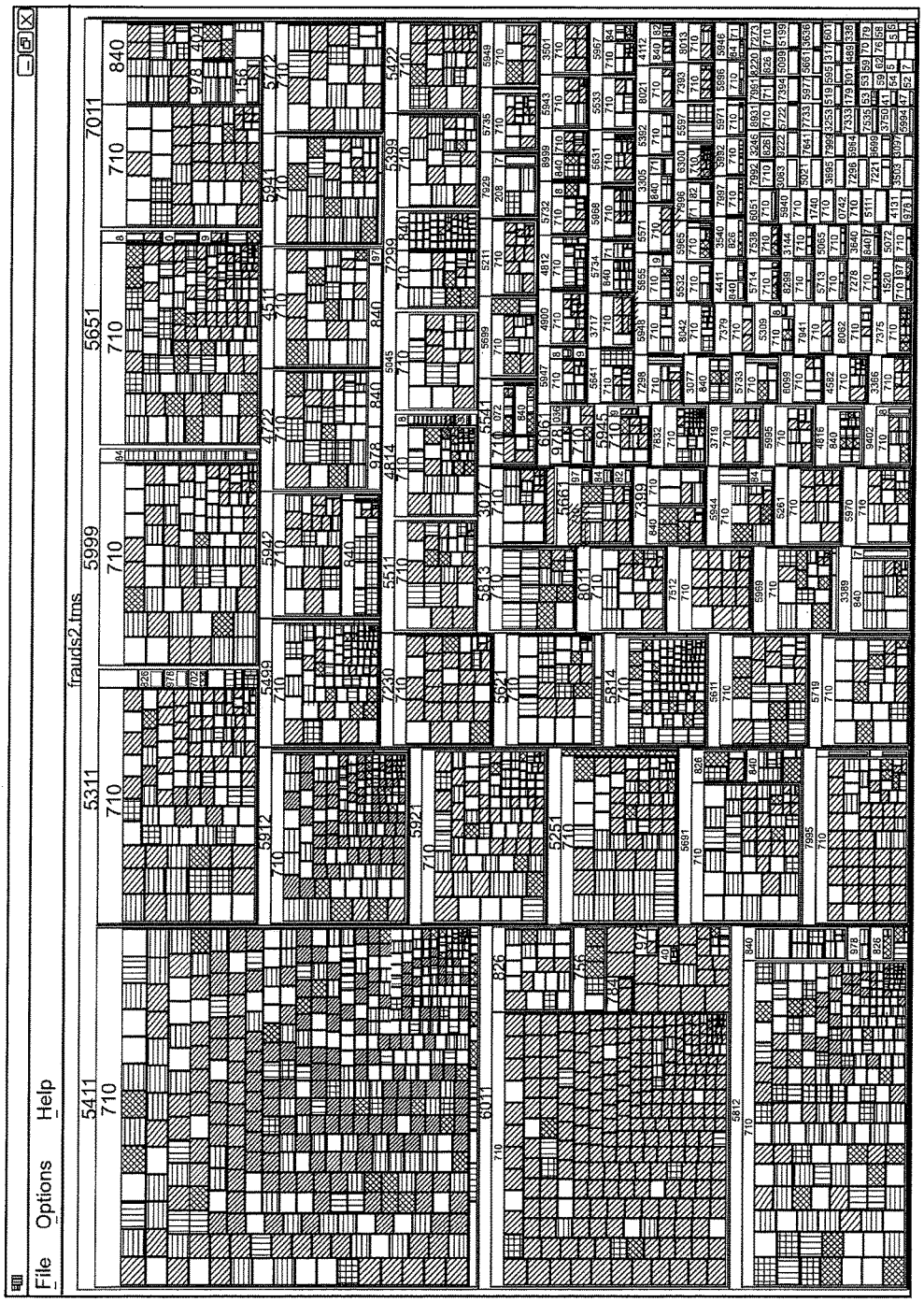
FIG. 6 shows yet another exemplary visualization for a fraud detection system.

Recent transactions from confirmed fraud accounts can be grouped into clusters according to characteristic variables. FIG. 6 illustrates a few transactions according to merchant category, transaction amount, time, speed, location, etc. Tree maps are used to visualize different types of transactions according to different hierarchies and bins. A tree map is a mosaic of rectangular fields based on the data. The size, color, and hierarchy can be used to display different information. Tree maps help users to easily filter out less interesting data and focus on crucial outliers.

In FIG. 6, each small node represents a transaction. The size of a node represents the amount. Different colors, shadings or textures represent different fraud scores, with red or yellow for higher scores, and blue or green for lower score, for example. From the tree map it is shown that the left top cluster has higher risk than the left middle cluster, and a generally higher transaction amount. When a new suspicious transaction is received and determined, it is placed on the cluster map so that the analyst can get a brief overview about its risk level. For example, if the transaction is an ATM transaction and amount is high, it is more likely a fraud according to the figure.

This tree map can be used as a real time summary of global fraud transactions. It provides some basic information about the fraud amount distribution, score distribution across different merchant categories, and model performance. More tree maps may be provided according to different time frames. In some implementations, a user often needs to get an overview of frauds and scores in one week, one month, or one year. The visualization system helps users to create customized rules for fraud detection facilitating their gaining a detailed understanding of the data patterns.

Suspicious Transactions Visualization

Recent suspicious transactions from accounts with high scores are visualized to provide reference information in the system. A suspicious account in the system is defined as an account with score above a certain threshold whose fraud status has not yet been confirmed. Similar to recent fraud visualization, the system applies bar chart, smoothed curves, and tree maps to present suspicious account's recent transactions.

The main reason for visualizing suspicious transactions is to provide a reference. Clustering methods can be included in the system. Some examples are self organization maps, density based clustering, etc. The clustering can be done in batch mode, and results are stored for further visualization. An unknown transaction can be compared to recent suspicious spending patterns using visualization, and this provides a direct view of the fraud risk of the account.

User Interface

Figure 7:
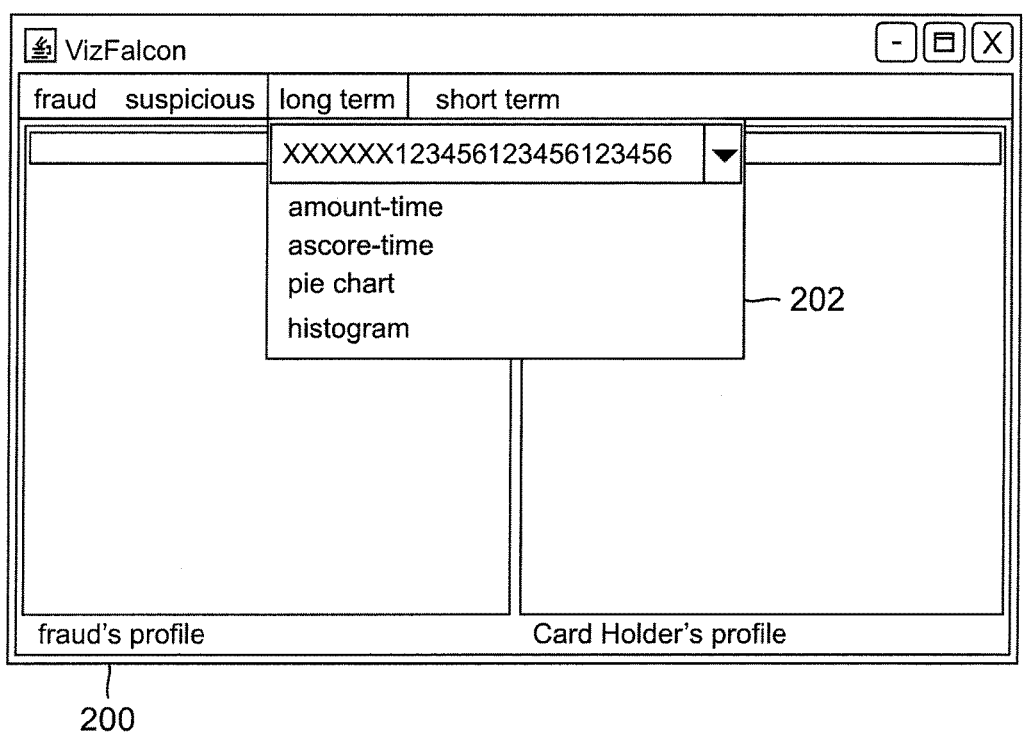
FIG. 7 shows a common graphical user interface with drop controls to switch from one visualization to another.

The user interface is an important part of the visualization system. It applies coordinated views for efficient interactivity. Menus, buttons, and options are designed intuitively for usability. FIG. 7 shows an example of the user interface for a fraud visualization system. All visualizations are in individual modules. A user can choose to visualize either fraud transactions, recent suspicious transactions, or the user can choose to visualize one particular account's long term or short term history. Within the user interface, there are comparisons of a fraudster's profile with a card holder's profile.

Using The System

The main goal of the fraud visualization system is to facilitate analysts to make better and more rapid decisions.

It is preferably used as an augmentation, rather than a replacement, of existing automatic fraud detection systems. Visualization is particularly helpful when the card holder is not accessible, or an analyst has to make a rapid decision on a case, or in the design of expert rules.

The following is one scenario of using the fraud visualization system. When a new case is created based on a fraud score, and the card holder cannot be contacted, an analyst looks at the short term transition geographic-state graph and time series graph. For example, if the account is being used all over the world in a short period of time, then it is very likely a fraud. If a decision cannot be made based on only short term visualization, the analyst checks the long term time series. For example, if an account has been silent for a while, and suddenly a series of rapid transactions happen and those are small amount grocery transactions, then it might not be a fraud. If the decision still cannot be made, the analyst checks the bar chart and smoothed curve chart. The bar chart shows if the spending changes in the last day, last week, or last month. The smooth curve shows if the account pattern is close to any fraud clusters. Alternatively, if the account's pattern is closer to the fraud pattern than the suspicious pattern, then likely the account is a fraud. Even if a decision cannot be made based on visualizations, the system helps the user to gain an understanding of possible reasons for the high scores.

The analyst may work with a rule writer to create rules based on their visualization experience to help future decisions. For example, FIG. 4 illustrates significant difference between suspects and fraud clusters or non-frauds. Based on that visualization, the Euclidean distance of a suspect's history with references to fraud and non-fraud examplars, may be calculated. If it is closer to the fraud cluster, then the account is more likely fraud based on similarity to the corresponding cluster.

Some or all of the functional operations described in this specification can be implemented in digital electronic circuitry, or in computer software, firmware, or hardware, including the structures disclosed in this specification and their structural equivalents, or in combinations of them. Embodiments of the invention can be implemented as one or more computer program products, i.e., one or more modules of computer program instructions encoded on a computer readable medium, e.g., a machine readable storage device, a machine readable storage medium, a memory device, or a machine-readable propagated signal, for execution by, or to control the operation of, data processing apparatus.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, that is generated to encode information for transmission to suitable receiver apparatus.

A computer program (also referred to as a program, software, an application, a software application, a script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to, a communication interface to receive data from or transfer data to, or both, one or more mass storage devices for storing data, e.g., magnetic, magneto optical disks, or optical disks.

Moreover, a computer can be embedded in another device, e.g., a mobile telephone, a personal digital assistant (PDA), a mobile audio player, a Global Positioning System (GPS) receiver, to name just a few. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Certain features which, for clarity, are described in this specification in the context of separate embodiments, may also be provided in combination in a single embodiment. Conversely, various features which, for brevity, are described in the context of a single embodiment, may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Particular embodiments of the invention have been described. Other embodiments are within the scope of the following claims. For example, the steps recited in the claims can be performed in a different order and still achieve desirable results. In addition, embodiments of the invention are not limited to database architectures that are relational; for example, the invention can be implemented to provide indexing and archiving methods and systems for databases built on models other than the relational model, e.g., navigational databases or object oriented databases, and for databases having records with complex attribute structures, e.g., object oriented programming objects or markup language documents. The processes described may be implemented by applications specifically performing archiving and retrieval functions or embedded within other applications.

The invention claimed is:

1. A system comprising:
   a database storing transaction data and account data related to one or more payment card accounts, the transaction data including short-term historical data and long-term historical data related to transactions executed by the one or more payment card account, the transaction data including a fraud score for one or more transactions that have a score for a set of transaction variables that exceed a threshold set by a fraud management system operatively coupled to the database via a communication network;
   a computer processor that generates one or more of a plurality of visualizations of activity of at least one suspicious account from the one or more payment card accounts for display in an interactive graphical user interface, one or more of the plurality of visualizations providing at least a graphical representation of the transaction data and the fraud score selectable from a menu provided by the computer processor in the interactive graphical user interface, the plurality of visualizations including transaction data of at least one confirmed fraud account as a reference, the plurality of visualizations comprising at least one or more of a geographic map depicting the activity of the at least one suspicious account at one or more locations identified by corresponding points on the geographic map, the activity characterizing data associated with one or more of transactions at an automated teller machine (ATM), time of transactions, keyed transactions, or transactions for obtaining gas, or a time series plot depicting history of activities of the at least one suspicious account over a course of at least two or more of one day, one week, one month or other finite time span for one or more categories of transactions, such that side-by-side visual presentation of the history of activities for multiple time spans improves fraud detection capabilities; and
   the interactive graphical user interface to dynamically display one or more of the plurality of visualizations, improving fraud detection capabilities of the fraud detection computing system, by further calculating a Euclidean distance between two points on a historical timeline graph for a suspicious account, wherein a calculated Euclidian distance that is closer to a known fraud cluster than to a known non-fraud cluster provides a further indication of potential fraud.

2. The system in accordance with claim 1, wherein the at least one suspicious account has a fraud score that exceeds a predetermined threshold fraud score and satisfies at least one of a plurality of expert rules criteria for case generation.

3. The system in accordance with claim 1, wherein the plurality of visualizations include a bar graph depicting the activity of the at least one suspicious account, the activity comprising a long-term historical activity and a short-term historical activity, the activity characterizing data associated with one or more transactions at an automated teller machine (ATM), time of transactions, keyed transactions, and transactions for obtaining gas.

4. The system in accordance with claim 1, wherein the plurality of visualizations include a time series plot depicting the activity of the at least one suspicious account, the time series plot dynamically displaying transaction scores for corresponding dates.

5. The system in accordance with claim 1, wherein the plurality of visualizations of activity of the at least one suspicious account further includes a visualization of activity of the confirmed fraud account.

6. A computer-implemented method comprising:
   storing transaction data and account data related to one or more payment card accounts in a database of a computerized fraud detection system, the transaction data including a fraud score, short-term historical data and long-term historical data related to transactions executed by the one or more payment card accounts;
   generating one or more of a plurality of visualizations of activity of at least one suspicious account from the one or more payment card accounts, at least one of the plurality of visualizations providing at least a graphical representation of the transaction data selectable from a menu provided by an interactive graphical user interface of the computerized fraud detection system, the plurality of visualizations comprising at least one or more of a geographic map depicting the activity of the at least one suspicious account at one or more locations identified by corresponding points on the geographic map, the activity characterizing data associated with: one or more transactions at an automated teller machine (ATM), time of transactions, keyed transactions, and transactions for obtaining gas, or a time series plot depicting history of activities of the at least one suspicious account over a course of at least two or more of one day, one week, one month or other finite time span for one or more categories of transactions, such that side-by-side visual presentation of the history of activities for multiple time spans improves fraud detection capabilities; and
   dynamically displaying, by the interactive graphical user interface, one or more of the plurality of visualizations, improving fraud detection capabilities of the fraud detection computing system, by further calculating a Euclidean distance between two points on a historical timeline graph for a suspicious account, wherein a calculated Euclidian distance that is closer to a known fraud cluster than to a known non-fraud cluster provides a further indication of potential fraud.

7. The method in accordance with claim 6, wherein the at least one suspicious account has a fraud score that exceeds a predetermined threshold fraud score set by a fraud management system operably coupled to the database via a communication network.

8. The method in accordance with claim 6, wherein the plurality of visualizations include transaction data of a confirmed fraud account as a reference.

9. The method in accordance with claim 6, wherein the plurality of visualizations include a bar graph depicting the activity of the at least one suspicious account.

10. The method in accordance with claim 6, wherein the plurality of visualizations include a time series plot depicting the activity of the at least one suspicious account.

11. The method in accordance with claim 9, wherein the plurality of visualizations of activity of the at least one suspicious account further includes a visualization of activity of the confirmed fraud account.

12. The system in accordance with claim 1, wherein the plurality of visualizations comprises a histogram that represents the transaction data and the fraud score with color.

13. The system in accordance with claim 1, wherein the plurality of visualizations comprises a smoothed curve chart dynamically displaying the transaction data related to a payment card account along with the transaction data of at least one confirmed fraud account for reference.

14. A non-transitory computer program product storing instructions that, when executed by at least one programmable processor, cause the at least one programmable processor to perform operations comprising:

storing transaction data and account data related to one or more payment card accounts in a database of a computerized fraud detection system, the transaction data including a fraud score, short-term historical data and long-term historical data related to transactions executed by the one or more payment card accounts;

generating one or more of a plurality of visualizations of activity of at least one suspicious account from the one or more payment card accounts, at least one of the plurality of visualizations providing at least a graphical representation of the transaction data selectable from a menu provided by an interactive graphical user interface of the computerized fraud detection system, the plurality of visualizations comprising at least one or more of a geographic map depicting the activity of the at least one suspicious account at one or more locations identified by corresponding points on the geographic map, the activity characterizing data associated with: one or more transactions at an automated teller machine (ATM), time of transactions, keyed transactions, and transactions for obtaining gas, or a time series plot depicting history of activities of the at least one suspicious account over a course of at least two or more of one day, one week, one month or other finite time span for one or more categories of transactions, such that side-by-side visual presentation of the history of activities for multiple time spans improves fraud detection capabilities; and dynamically displaying, by the interactive graphical user interface, one or more of the plurality of visualizations, improving fraud detection capabilities of the fraud detection computing system, by further calculating a Euclidean distance between two points on a historical timeline graph for a suspicious account, wherein a calculated Euclidian distance that is closer to a known fraud cluster than to a known non-fraud cluster provides a further indication of potential fraud.

\* \* \* \* \*